Figure 1:
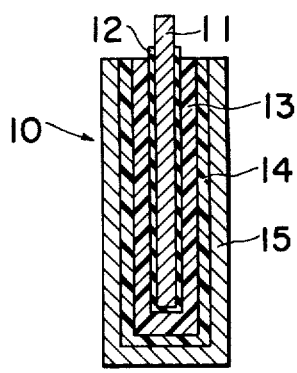

United States Patent [19]

Itoh

[11] 4,009,424

[45] Feb. 22, 1977

[54] ELECTROLYTIC CAPACITOR HAVING A CONDUCTIVE GRAPHITE PARTICLES LAYER BETWEEN ORGANIC SOLID ELECTROLYTE AND CATHODE

[75] Inventor: Yoshimasa Itoh, Kawasaki, Japan

[73] Assignee: Matsushita Electric Industrial Co., Ltd., Kadoma, Japan

[22] Filed: Mar. 26, 1975

[21] Appl. No.: 562,110

[30] Foreign Application Priority Data

Mar. 26, 1974 Japan .............................. 49-34298

[52] U.S. Cl. .................................. 361/433; 29/570
[51] Int. Cl.² ...................... H01G 9/00; B01J 17/00
[58] Field of Search ....................... 317/230; 29/570

[56] References Cited

UNITED STATES PATENTS

| | | | |
|---|---|---|---|
| 3,675,087 | 7/1972 | Zykov et al. | 317/230 |
| 3,679,944 | 7/1972 | Yoshimura | 317/230 |
| 3,898,539 | 8/1975 | Yoshimura et al. | 317/230 |

*Primary Examiner*—Andrew J. James
*Attorney, Agent, or Firm*—Depaoli & O'Brien

[57] ABSTRACT

The capacitor has a conductive layer, which is a dispersion of fine particles of graphite in a solidified polymer amounting to from 1 to 10% by weight of graphite, between and in intimate contact with a cathode and a solid electrolyte layer which is formed on an anodized valve metal and made of a semiconductive salt of 7,7,8,8-tetracyanoquinodimethane and a polymer. The conductive layer is formed by applying a suspension of graphite particles, the mean particle size of which preferably ranges from 1 to 7 μm, in a solution of a polymer in a low viscosity and easily evaporable solvent, e.g. ethanol, onto the electrolyte layer followed by drying at or slightly above room temperature to evaporate the solvent and solidify polymer.

5 Claims, 3 Drawing Figures

ELECTROLYTIC CAPACITOR HAVING A CONDUCTIVE GRAPHITE PARTICLES LAYER BETWEEN ORGANIC SOLID ELECTROLYTE AND CATHODE

This invention relates generally to electrolytic capacitors of the organic solid electrolyte type, and more particularly to such capacitors featuring the provision of a conductive layer between the solid electrolyte and cathode and a method of forming the same layer.

Conventional electrolyte capacitors of the solid electrolyte type may be divided generally into two groups: older one employing manganese dioxide as the solid electrolyte and the other employing an organic semiconductive substance. In the former group, an intermediate conductive layer of either finely powdered graphite or carbon black is frequently formed between and in intimate contact with the manganese dioxide layer and cathode for the purpose of improving electrical contact and/or ensuring adhesion of the manganese dioxide layer to a dielectric oxide film formed on the anode. The conductive layer can be formed simply by the application of a suspension of, e.g., colloidal graphite in water onto the electrolyte layer followed by drying, but this method usually has a shortcoming of causing leakage current in the capacitor. This is because some of the graphite particles, which are usually about 1 micron ($\mu$m) or smaller in particle size, permeate into the manganese dioxide layer which is microscopically porous in most cases and reach the surface of the dielectric oxide film. To eliminate such a shortcoming and, furthermore, to attain better electrical and mechanical contact between the conductive layer and the manganese dioxide layer, now it prevails to form the conductive layer with a dispersion of finely powdered or colloidal graphite in a thermosetting resin such as a cresol-formaldehyde resion or polymethylphenyl siloxane resin which can be heat-cured at temperatures ranging from about 150° to about 180° C.

The provision of a similar conductive layer is considered desirable also for the latter group of capacitors which employ an organic semiconductor. However, a different method is needed for forming such a layer on an organic semiconductor layer since almost every organic semiconductor which is known as an excellent solid electrolyte for capacitors cannot withstand such a high temperature as employed in heat-curing of a thermosetting resin.

It is therefore an object of the present invention to provide an improved electrolytic capacitor of the organic solid electrolyte type by the provision of a graphite-base conductive layer between the electrolyte layer and cathode, which conductive layer has little adverse effect on the inherent properties of the electrolyte and brings about a high dielectric strength and a good stability of the capacitor over a long period of time.

It is another object of the invention to provide a method of forming a conductive layer containing therein graphite particles on an organic solid electrolyte layer formed on a valve metal anode for an electrolytic capacitor.

The invention is concerned with an electrolytic capacitor having an anode of a valve metal covered with a dielectric film of an oxide of the valve metal, a solid electrolyte layer which is formed on and in intimate contact with the dielectric film and made of a polymer and a semiconductive salt of 7,7,8,8-tetracyanoquinodimethane (hereinafter called TCNQ for brevity) and a cathode opposite the electrolyte layer. According to the invention, the capacitor further comprises a conductive layer formed between and in intimate contact with the electrolyte layer and the cathode, which conductive layer is a dispersion of finely powdered graphite in a solidified polymer amounting to from 1 to 10% by weight of the graphite.

The mean particle size of the graphite is preferably in the range between 1 and 7 microns. The polymer in the conductive layer is preferably the same substance as the polymer in the electrolyte layer and preferably selected from polyvinyl pyrrolidone, polyvinyl acetate, a copolymer of them, polyvinyl acetal, polyvinyl ether, an organopolysiloxane which is hardenable at room temperature, polybutadiene, a copolymer of butadiene and acrylonitrile, and cellulose acetate.

According to a method of the invention, the conductive layer is formed by the steps of applying a suspension of finely powdered graphite in a solution of a polymer in a solvent having a relatively low viscosity onto the solid electrolyte layer, the amount of which polymer is 1 to 10% by weight of the graphite, and drying the applied suspension at a temperature between room temperature and a higher critical temperature for allowing the TCNQ salt to exhibit a stable resistivity thereby to evaporate the solvent and solidify the polymer.

The solvent must be easily evaporable and is preferably water, ethanol or benzene.

Figure 2:
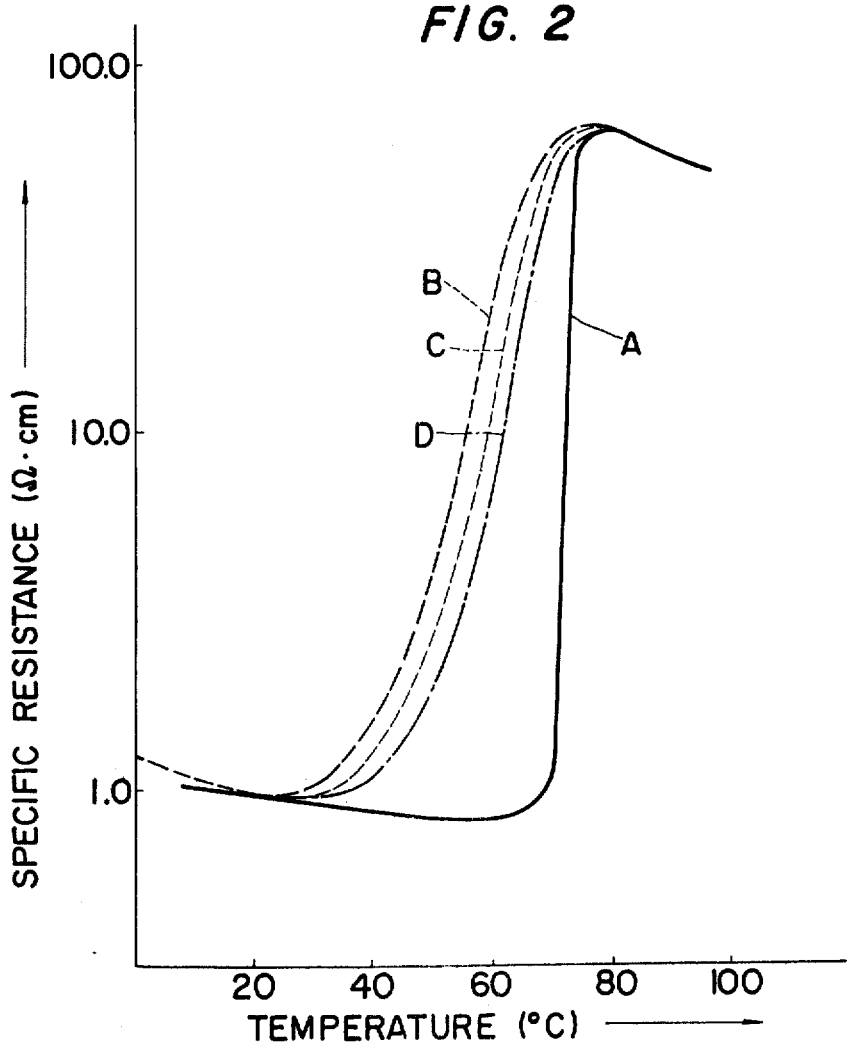
Figure 3:
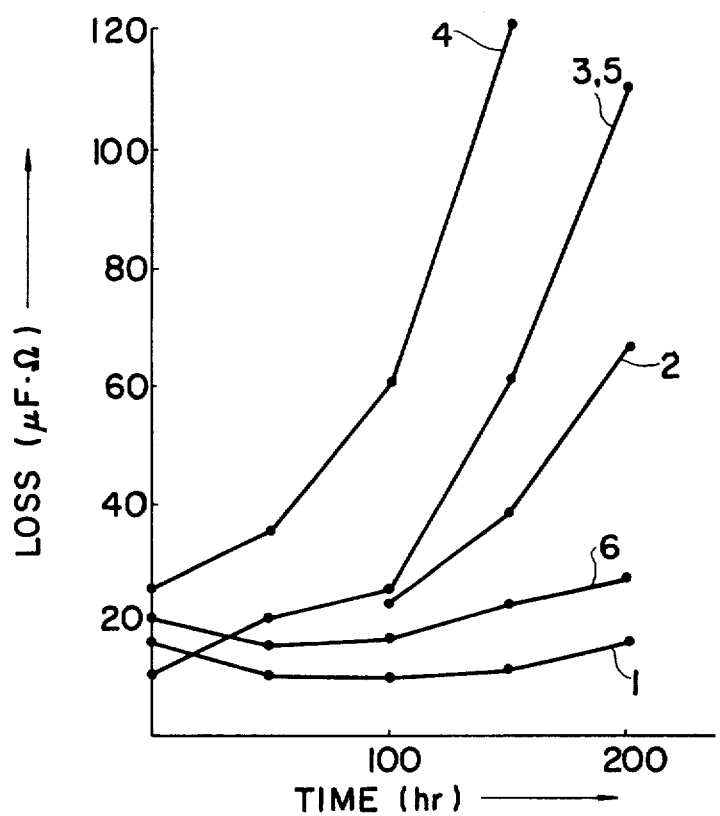

Other features and advantages of the invention will become apparent from the following detailed description of preferred embodiments thereof with reference to the accompanying drawings, in which:

FIG. 1 is a longitudinal sectional view of a solid electrolyte capacitor in accordance with the invention;

FIG. 2 is a graph showing variations in the dielectric loss with the lapse of time for capacitors according to the invention and a few capacitors not in accordance with the invention; and FIG. 3 is a graph showing the relationship between resistivity and temperature for a TCNQ salt and variations in this relationship caused by the use of a few kinds of curing agents in forming a conductive layer on a layer of the TCNQ salt.

An electrolytic capacitor 10 according to the invention has a general construction as illustrated in FIG. 1. An anode 11 is made of a valve metal such as, e.g., aluminum or tantalum, and the surface of the anode 11 is electrochemically oxidized to give a dielectric oxide film 12. A solid electrolyte layer 13 is formed on and in intimate contact with the oxide film 12. The electrolytic layer 13 is made of an organic solid and semiconductive substance and a solidified polymer. Numerous kinds of ion-radical salts of TCNQ are typical examples of the essential material of this electrolyte layer 13. The useful TCNQ salts are described together with polymers for forming the electrolyte layer 13 in a number of prior patents, e.g., in U.S. Pats. Nos. 3,115,505; 3,483,438; 3,679,944 and 3,872,358. The electrolyte layer 13 is intimately covered with a conductive layer 14 which comprises a major amount of finely powdered graphite particles. A cathode 15 of either a metal sheet or a microscopically porous metal matrix covers the exterior of the conductive layer 14. In the present invention no modification is introduced into this well known construction except for the provision of the conductive layer 14, so that any further description of the respective elements other than the conductive layer 14 will be needed as well as production methods thereof.

In the present invention, the particle size of finely powdered graphite is contemplated as an important factor governing the properties of the conductive layer 14 and the influence of the conductive layer 14 on the properties of the capacitor 10. To examine the effect of the particle size of graphite, an experiment was carried out by forming a graphite layer on a TCNQ salt layer by the application of a suspension of finely powdered graphite in ethyl alcohol. For four samples of graphite particles each having a distinct mean particle size, each twenty capacitors were fabricated in the same manner. Inspection of these capacitors revealed that the number of defective capacitors (which were practically short-circuited) among 20 samples was apparently depending on the mean particle size of the graphite as shown in Table 1.

Table 1

| Mean Particle Size, Graphite ($\mu$m) | Number of Defective Capacitor | Percent Defective |
|---|---|---|
| 10 | 0 | 0 |
| 7 | 1 | 5 |
| 3 | 2 | 10 |
| 1 | 6 | 30 |
| 1> | 9 | 45 |

Thus it was ascertained that the percent defective (short-circuited) increases as the mean particle size of the graphite particles becomes smaller. A similar tendency was observed in the result of a dielectric strength test for the same capacitors. It is assumed that the graphite particles permeate into the electrolyte layer and sometimes migrate to the surface of the oxide film when the particle size is extremely small. A mean particle size of 7 microns at the smallest seems desirable from the result of the above experiment. From a different point of view, the use of a liquid having a higher viscosity than ethyl alcohol or water may be advantageous for preventing migration of the graphite particles and occurrence of short-circuited products.

On the other hand, the fundamental role of the conductive layer 14 must not be forgotten. It is expected that graphite particles fill micro-pores and cavities existing on the surface of the electrolyte layer 13 thereby to improve electrical conductivity between the two layers 13 and 14, and hence between the electrolyte layer 13 and the cathode 15. For this purpose, particle size of the graphite is smaller the better and the viscosity of the liquid for the graphite suspension is lower the better.

According to the invention, these contradictory requirements are met simultaneously and well balancedly by the employment of a dispersion of graphite particles having a mean particle size within a particular range in a solution of a selected polymer in a low viscosity solvent such as, e.g., water or ethyl alcohol. The amount of the polymer in the solution is particularly determined relatively to the weight of the dispersed graphic particles. Mean particle size of the graphite is preferably in the range between 1 and 7 microns and more preferably between 2 and 5 microns as explained hereinafter. The polymer is used to attain an adequate viscosity of the dispersion medium and enhance the adhesing property of the resulting conductive layer 14, but the amount of the polymer should be limited to 10% by weight of the graphic particles at the maximum for obtaining the capacitor 10 of good stability and long life.

Various conventional synthetic resins are useful as the polymer for the preparation of the graphite suspension for forming the conductive layer 14 so long as the following requirements are met. The polymer must be soluble in a solvent having a boiling point of 100° C at the highest, so that a solid film may be given at temperatures below a critical temperature to the inherent resistivity of the TCNQ salt. It is desirable that solidification of the polymer is realized without using a curing agent. If a curing agent is necessary, the curing agent must be active at a temperature below the abovementioned critical temperature and chemically inactive to the TCNQ salt. These requirements are important since semiconductive TCNQ salts are generally unstable at elevated temperatures and easily affected by various substances such as amines, acids, alkalis and peroxides which are useful as curing agents for resins. Most of known semiconductive salts of TCNQ decompose at temperatures ranging from about 200° to about 250° C, but they exhibit a permanent change in the specific resistance at lower temperatures ranging from about 40° to about 180° C. If a thermosetting resin such as an epoxy-, phenol- or polyester-resin is applied on a layer of a TCNQ salt and heat-cured by the use of a curing agent belonging to the above-mentioned substances, the specific resistance of the TCNQ salt changes considerably even if the curing temperature is kept below a critical temperature.

An experiment was carried out for observing the influences of a few kinds of curing agents on the resistivity of TCNQ salt. An epoxy resin mixed with a curing agent was applied on a layer of (N-methylquinolinium)$^+$(TCNQ)$^-$(TCNQ)$_{1.2}$ and heat -cured. Specific resistance of the TCNQ salt layer was measured at various temperatures before and after the application and curing of the resin with respect to three types of curing agents, and the results are shown in FIG. 2. The curve A represents the TCNQ salt layer before the application of the resin and curves B, C and D represent the resin coating using ethylene diamine, phthalic anhydride and an isocyanate, respectively, as the curing agent.

Based on these facts, the polymer for the conductive layer 14 according to the invention is selected from polyvinypyrrolidone, polyvinyl acetate, a copolymer of them, polyvinyl acetal such as, e.g., polyvinyl butyral, a polyvinyl alcohol-silicone resin (organopolysiloxane) which is hardenable at room temperature, e.g., diacyloxy siloxane resin, polybutadiene, a copolymer of butadiene and acrylonitrile, polyvinyl ether such as, e.g., polyvinyl methylethyl ether and a cellulose resin such as, e.g., cellulose acetate.

As is known, most of these polymers are useful for forming the electrolyte layer 13 together with a TCNQ salt. It is preferable to form the electrolyte layer 13 and the conductive layer 14 by the use of the same polymer.

EXAMPLE 1

The capacitor 10 of FIG. 1 was fabricated by the use of aluminum as the material of the anode 11 and cathode 15 and (N-methylquinolinium)$^+$(TCNQ)$^-$(TCNQ)$_{1.2}$ as the organic solid semiconductor for the electrolyte 13. The conductive layer 14 was formed by the application of a suspension of finely powdered graphite particles in a solution of polyvinyl pyrrolidone in ethyl alcohol followed by drying at room temperature. The mean particle size of the graphite particles was in the range between 2 and 5 microns, and the amount of polyvinyl pyrrolidone was varied from 5 to 15% by weight of the graphite particles. Separately, capacitors 10 of the same construction were produced by forming the conductive layer 14 from a suspension of finely powdered graphite particles in water containing no polymer. To summarize, the following 6 variations in the graphite suspension were employed, and the dielectric loss were measured at 120 Hz for the resulting capacitors 10 every 50 hr after the production. The results are shown in FIG. 3, in which reference numerals for the respective curves correspond to the sample numbers in Table 2.

Table 2

| Sample No. | Polyvinyl pyrrolidone | Mean particle size, graphite |
|---|---|---|
| 1 | 5% | 2 to 5$\mu$m |
| 2 | 10% | " |
| 3 | 20% | " |
| 4 | 25% | " |
| 5 | 0 | 5 to 7$\mu$m |
| 6 | 0 | 1 to 2$\mu$m |

Although the mean particle size of the graphite particles was kept in the same range in test Nos. 1 to 4 (which range was expected to be optimum taking into consideration both the percent defective of the products and pore-filling ability of the graphite particles), noticeable lowerings in the stability of the capacitor 10 were observed when relatively large amounts of the polymer were used. The permissible upper limit of the amount of the polymer is judged to be 10% by weight of the graphite particles. The influence of the mean particle size of the graphite particles on the stability of the capacitor 10 can be best seen from a comparison of the curves 5 and 6. In the test No. 5, the percent defective of the products (showing leakage current) was quite low like the result of the previous experiment shown in Table 1, but the stability of the capacitor 10 was considerably poor despite the use of no polymer. In the test No. 6, on the contrary, the percent defective of the products was considerably high, but the non-defective products obtained through screening of the total products exhibited a quite satisfactory stability.

This Example was repeated to ascertain the influence of the polymer content in the conductive layer 14 on the stability of the capacitor. The mean particle size of the graphite was constantly from 2 to 5 microns, and the amount of the polymer to the graphite was varied from 0 to 25% by weight. Results of dielectric loss measurement at 120 Hz after 50 hr from the production are shown in Table 3.

Table 3

| Polyvinyl pyrrolidone (%) | Loss ($\mu$F . $\Omega$) |
|---|---|
| 0 | 10 |
| 2 | 14 |
| 5 | 12 |
| 7 | 13 |
| 10 | 16 |
| 20 | 22 |
| 25 | 32 |

Judging from these results, the mean particle size of the graphite particles lies preferably in the range between 1 and 7 microns at the widest, and the narrower range between 2 and 5 microns is more preferable from the practical viewpoint. The data in Table 3 also show that excellent capacitors can be obtained when the amount of the polymer in the conductive layer 14 is limited to 10% by weight of the graphite at the most. There seems no lower limit to the amount of the polymer from the data in Table 3. It is preferable, however, to use a polymer in an amount of at least 1% by weight of the graphite particles to give satisfactory physical strength and adhesion strength to the conductive layer 14.

It was ascertained by a separate experiment that a good conductive layer is obtained even from an excessively fine graphite powder (smaller than 1 micron) if the powder is dispersed in a polymer amounting to from 5 to 10% by weight of the powder.

EXAMPLE 2

The capacitors 10 of Example 1 were produced and subjected to measurements after 50 hr from the production by forming the conductive layer 14 from a suspension of a graphite powder in a solution of polyvinyl butyral in ethanol.

When mean particle size of the powder was between 1 and 2 microns, the capacitance and dielectric loss of the capacitors 10 were 0.08 to 0.13 $\mu$F and 10 to 14 $\mu$F.$\Omega$, respectively, for both the polymer contents of 5% and 10%. When mean particle size of the powder was between 2 and 5 microns, similar capacitance values and 10 to 16 $\mu$F.$\Omega$ of the loss were observed for both the polymer contents of 5% and 10%.

EXAMPLE 3

Example 2 was repeated except that a copolymer of polyvinyl pyrrolidone and polyvinyl acetate was used as the polymer and that the solvent was a mixture of ethanol and water. The characteristics of the resulting capacitors were almost similar to the results of Example 2.

EXAMPLE 4

This example also was carried out generally similarly to Example 2. The polymer and the solvent were polybutadiene and benzene, respectively. When mean particle size of graphite powder was between 1 and 2 microns and the polymer content was 5%, the dielectric loss was 10 to 20 $\mu$F.$\Omega$. When the mean particle size and the polymer content were 2 to 5 microns and 10%, respectively, the loss was 15 to 28 $\mu$F.$\Omega$. The capacitance was in the same range as in Example 2.

What is claimed is:

1. In an electrolytic capacitor having an anode of a valve metal covered with a dielectric film of an oxide of the valve metal, a solid electrolyte layer formed on the dielectric film, a cathode spaced from the anode and a conductive layer formed between and in intimate contact with the electrolyte layer and the cathode, the electrolyte layer being made of a semiconductive salt of 7,7,8,8-tetracyanoquinodimethane and a polymer and formed on and in intimate contact with the dielectric film, the improvement comprisng said conductive layer as a dispersion of finely powdered graphite in a thermoplastic resin amounting to from 1 to 10% by weight of said graphite, said graphite having a mean particle size ranging from 1 to 7 microns.

2. The improvement as claimed in claim 1, wherein said graphite has a mean particle size ranging from 2 to 5 microns.

3. The improvement as claimed in claim 1, wherein said thermoplastic resin in said conductive layer is the same substance as said polymer in said electrolyte layer.

4. The improvement as claimed in claim 1, wherein said thermoplastic resin in said conductive layer is selected from the group consisting of polyvinyl pyrrolidone, polyvinyl acetate, a copolymer of polyvinyl pyrrolidone and polyvinyl acetate, polybutadiene, a copolymer of butadiene and acrylonitrile, cellulose acetate, polyvinyl acetal and polyvinyl ether.

5. In an electrolytic capacitor having an anode of a valve metal covered with a dielectric film of an oxide of the valve metal, a solid electrolyte layer formed on the dielectric film, a cathode spaced from the anode and a conductive layer formed between and in intimate contact with the electrolyte layer and the cathode, the electrolyte layer being made of a semiconductive salt of 7,7,8,8-tetracyanoquinodimethane and a polymer and formed on and in intimate contact with the dielectric film, the improvement comprising said conductive layer as a dispersion of finely powdered graphite in an organopolysiloxane resin which is hardenable at room temperature amounting to from 1 to 10% by weight of said graphite, said graphite having a mean particle size ranging from 1 to 7 microns.

* * * * *